United States Patent
Thompson et al.

(10) Patent No.: US 10,911,490 B2
(45) Date of Patent: Feb. 2, 2021

(54) ADAPTIVE, DECEPTIVE AND POLYMORPHIC SECURITY PLATFORM

(71) Applicant: A10 Networks, Inc., San Jose, CA (US)

(72) Inventors: Micheal Thompson, San Jose, CA (US); Richard Groves, San Jose, CA (US)

(73) Assignee: A10 NETWORKS, INC., San Jose, CA (US)

(*) Notice: Subject to any disclaimer, the term of this patent is extended or adjusted under 35 U.S.C. 154(b) by 498 days.

(21) Appl. No.: 15/856,456

(22) Filed: Dec. 28, 2017

(65) Prior Publication Data

US 2019/0207978 A1 Jul. 4, 2019

(51) Int. Cl.
*G06F 15/16* (2006.01)
*H04L 29/06* (2006.01)
(Continued)

(52) U.S. Cl.
CPC .......... *H04L 63/164* (2013.01); *G06K 9/6269* (2013.01); *G06N 20/00* (2019.01);
(Continued)

(58) Field of Classification Search
CPC ... H04L 63/164; H04L 63/0245; H04L 69/02; H04L 69/161; G06N 20/00; G06K 9/6269
(Continued)

(56) References Cited

U.S. PATENT DOCUMENTS

| 9,819,741 | B1* | 11/2017 | Pendse | H04L 41/145 |
| 2004/0111453 | A1* | 6/2004 | Harris | G06K 9/6269 |
| | | | | 708/200 |

(Continued)

OTHER PUBLICATIONS

Simon Westlinder, Video Traffic Classification, A Machine Learning approach with Packet Based Features using Support Vector Machine, Jun. 7, 2016, Karlstads University pp. 1-49 (Year: 2016).*

(Continued)

*Primary Examiner* — Atta Khan
(74) *Attorney, Agent, or Firm* — Edward C. Kwok; VLP Law Group, LLC

(57) ABSTRACT

A security platform running on a server includes (a) protocol stacks each configured to receive and to transmit IP data packets over a network interface, wherein the protocol stacks have predetermined performance characteristics that are different from each other and wherein each protocol stack includes one or more program interfaces to allow changes to its performance characteristics; (b) application programs each configured to receive and transmit payloads of the IP data packets, wherein at least two of the application programs are customized to handle different content types in the payloads and wherein each application program accesses the program interface of at least one protocol stack to tune performance characteristics of the protocol stack; (c) classifiers configured to inspect at a given time IP data packets then received in the network interface to select one of the protocol stack and one of the application programs to service the data packets; and (d) a control program to load and run the selected protocol stack and the selected application program.

23 Claims, 4 Drawing Sheets

(51) Int. Cl.
 *G06K 9/62* (2006.01)
 *G06N 20/00* (2019.01)
(52) U.S. Cl.
 CPC .......... *H04L 63/0245* (2013.01); *H04L 69/02* (2013.01); *H04L 69/161* (2013.01)
(58) Field of Classification Search
 USPC ........................................................ 709/230
 See application file for complete search history.

(56) References Cited

U.S. PATENT DOCUMENTS

| | | | |
|---|---|---|---|
| 2004/0165588 A1* | 8/2004 | Pandya | H04L 63/0272 370/389 |
| 2006/0075119 A1* | 4/2006 | Hussain | H04L 69/162 709/227 |
| 2011/0267964 A1* | 11/2011 | Baltatu | H04L 43/00 370/242 |

OTHER PUBLICATIONS

Husam Sarhan and Chansu Yu, Study on IP Anycast in Ad-Hoc Networks, Feb. 2003, Cleveland State University, pp. 1-15 (Year: 2003).*

* cited by examiner

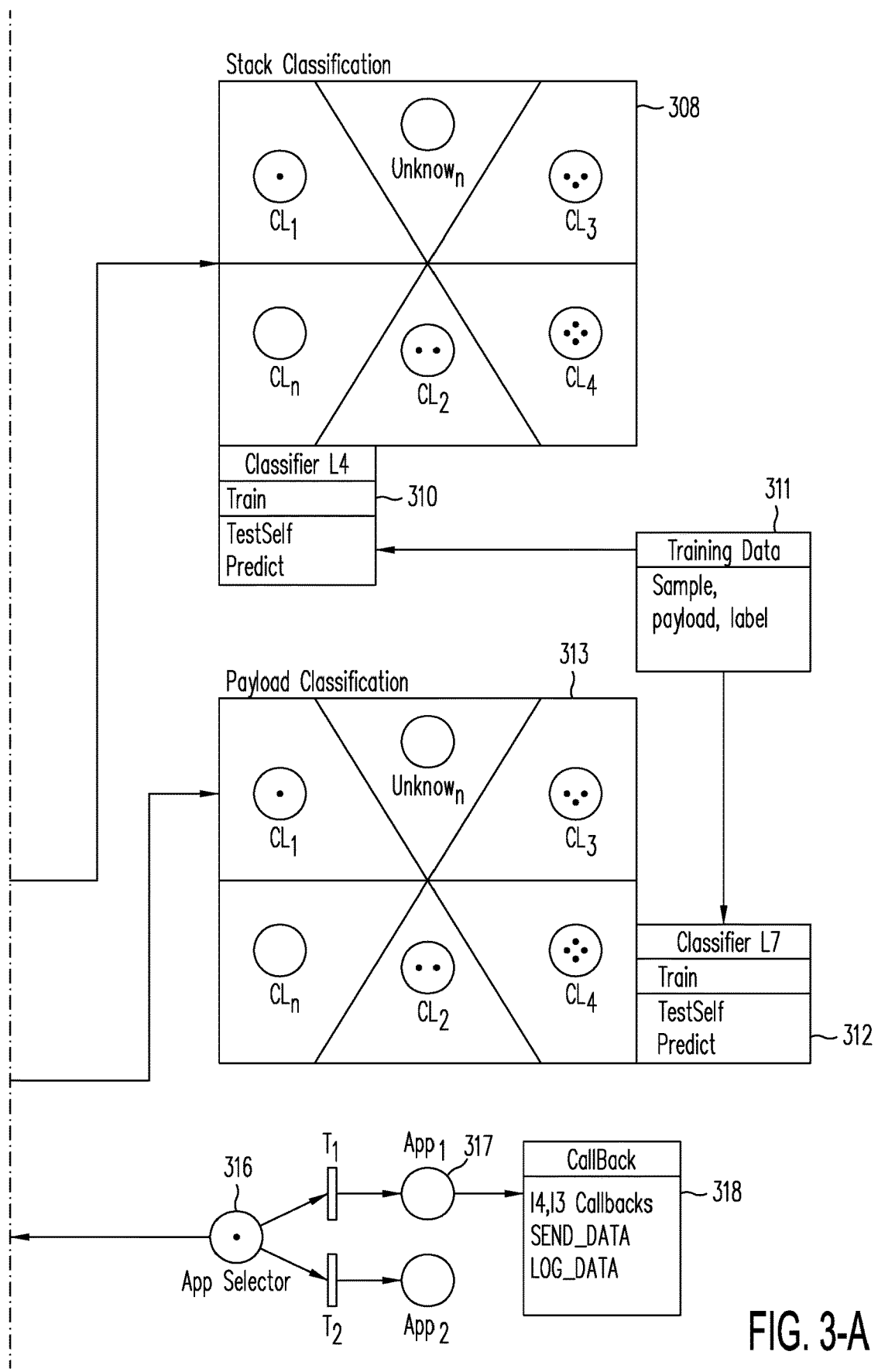
FIG. 3-A

ADAPTIVE, DECEPTIVE AND POLYMORPHIC SECURITY PLATFORM

BACKGROUND OF THE INVENTION

1. Field of the Invention

The present invention relates to tools for computer network and Application security. In particular, the present invention relates to providing a platform that allows network and application security threats to be identified and countermeasures to be dynamically invoked or evolved in order to deceive the attacker by emulation of the vulnerable surface area, computer operating system, management, data or control plane to be developed in real time, offline or near real time.

2. Discussion of the Related Art

The Internet has become an integral part of all commercial, political, social and other human activities. Malicious acts by various actors, political, commercial, religious or philosophical adversaries bent on destroying or disrupting such activities have become part of the landscape. Most of the malicious acts are themselves carried out remotely over the data traffic on the Internet. Such malicious acts include, for example, unauthorized access into a data network to obtain sensitive information (e.g., certain sensor readings), coordinated "botnet" attacks on servers aimed at interrupting valuable services (e.g., the "distributed denial of access (DDoS) attack"), corruption of data and other unwelcome activities. For each specific malicious act, it is necessary for the developer of a countermeasure to engage the adversary by inspecting the data traffic originated from the adversary or victims, identifying the nature of the threat, isolating the malicious act from their target of attack, and deploying the countermeasure to neutralize the threat, The methods of adversaries continuously change over time. By necessity, defenses to their malicious acts must therefore also adapt to deal with the adversaries' changing strategies, tactics and techniques. A platform that allows network security threats to be engaged and defenses to be developed, deployed and adapted against in real time is highly desired.

SUMMARY

According to one embodiment of the present invention, a security platform running on a server includes (a) one or more protocol stacks each configured to receive and to transmit IP data packets over a network interface, wherein the protocol stacks have predetermined performance characteristics that are different from each other and wherein each protocol stack includes one or more program interfaces to allow changes to its performance characteristics; (b) one or more application programs each configured to receive and to transmit payloads of the IP data packets, wherein at least one of the application programs are customized to handle different content types in the payloads and wherein each application program accesses the program interface of at least one protocol stack to tune performance characteristics of the protocol stack; (c) one or more classifiers configured to inspect at a given time IP data packets then received in the network interface to select one of the protocol stack and one of the application programs to service the data packets; and (d) a control program to load and run the selected protocol stack and the selected application program.

In one embodiment, the protocol stacks include a stateful and stateless handler usually in the form of a TCP handler and a UDP handler. The TCP handler may be configured by specifying parameter values of an included state machine. Differences in state machine parameter values may result in the different performance characteristics affecting the protocol stack selection in the classifiers.

According to one embodiment of the present invention, the classifiers select an application program dynamically based on a model which mimics operational characteristics of a target application. The network security platform loads the selected program to engage and isolate the adversary originating the incoming data packets, and to analyze the characteristics of the adversary, so as to allow development in real time of an effective countermeasure or honeypot. In one embodiment, the network security platform handles the data packets targeting an IP ANYCAST application using a TCP state exchange and service insertion technique between servers or receivers.

According to another embodiment of the present invention, the selected application program mimics a device interface for a sensor, such as an IoT sensor.

According to one embodiment of the present invention, the classifiers are trained using machine learning techniques, which may include both supervised and unsupervised machine learning techniques. The classifiers may implement a one-versus-all or a one-versus-rest multiclass or binary classification scheme. The one-versus-all classification scheme may include a linear support vector clustering (LinearSVC) estimator.

In one embodiment, port filtering may be implemented, including port filtering for ports that are not conventionally monitored in the targeted application.

The present invention is better understood upon consideration of the detailed description below in conjunction with the accompanying drawings.

BRIEF DESCRIPTION OF THE DRAWINGS

To facilitate cross-referencing among the figures, like elements are assigned like reference numerals in the detailed description.

DETAILED DESCRIPTION OF THE PREFERRED EMBODIMENTS

The present invention provides a security platform[1] on which network security threats can be engaged, isolated, analyzed and neutralize. In one embodiment, based on applying machine-learned classifiers on the metadata and the payloads of data packets in the data traffic associated with a network security threat, the security platform selects and acts as a server for a customized application program adapted for engaging the network security threat. The customized program application may be used to isolate the network security threat and to capture the malicious actions taken by the network security threat to allow analysis and to obtain information useful for developing an effective countermeasure against the network security threat. In one embodiment, the customized application program may mimic the operational characteristics of an application program ("targeted application program") that the network security threat targets. Based on the message content in the IP packets, the security platform may map the data stream related to the network security threat to one of multiple "TCP stacks" for mimicking the responses and the network operational environment of the targeted application program. (In the context of Internet data traffic, the term "TCP stack" refers collectively to a set of protocol handlers in the physical, link, Internet Protocol (IP) and Transmission Control Protocol (TCP) protocol layers of a network interface. The operation of a TCP stack is typically defined by a state machine, referred herein as a "TCP state machine.") One expected application is the emulation of device interfaces of IoT devices (e.g., IoT sensors). Emulations of IoT devices and other internet application systems enable global sensor distribution which reduces the time to detect malware or botnet. The security platform provides tools (e.g., in the form of callback methods) for the customized application program to exchange information and to modify the operational parameters of the TCP state machines.

[1] Such a security platform may also serve as what is colloquially referred to among network security professionals as a "honeypot."

Figure 1:
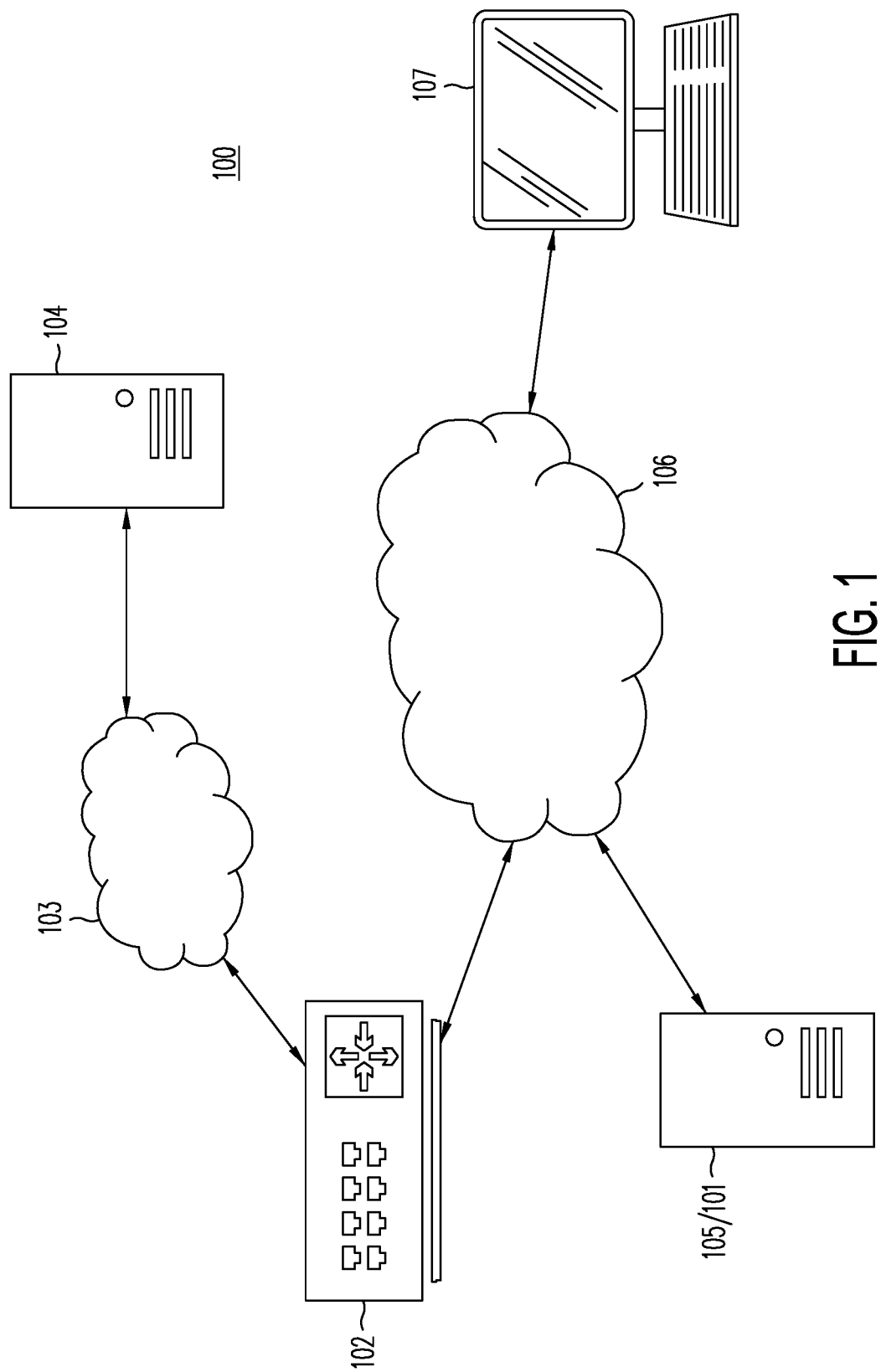
FIG. 1 illustrates system 100 in which security platform 101 of the present invention may be deployed.

FIG. 1 illustrates system 100 in which security platform 101 of the present invention may be deployed. As shown in FIG. 1, system 100 includes router 102 (e.g., an edge router of autonomous system 103) which routes data packets to and from server 104, which may be a server providing a valuable service on the Internet (106), and hence may be vulnerable as a possible target of malicious actions from an adversary. Router 102 may implement a security policy which diverts suspicious or randomly selected messages (or data streams) that designate an application on server 104 for handling by security platform 101 running on server 105. Although server 105 is shown to have a network interface directly connecting into Internet 106 and is shown not to be part of autonomous system 103, the present invention does not limit server 105 to a location outside autonomous system 103 (i.e., server 105 may reside within autonomous system 103, if desired). Using this approach, security platform 101 may be globally distributed to handle applications that use, for example, the IP ANYCAST message delivery paradigm. A user (107) may access security platform to develop applications or to conduct supervised machine learning activities to train the analytic modules (e.g., classifiers) in security platform 101. These activities are discussed in further detail below.

To seamlessly refer the messages or data streams of the targeted application program to security platform 101, router 102 may use a TCP state exchange and service insertion mechanism disclosed, for example, in copending U.S. patent application ("Copending Application"), Ser. No. 14/825,096, filed on Aug. 12, 2015 and published as U.S. Patent Application Publication 2017/0048356A1, entitled "Transmission Control of Protocol State Exchange for Dynamic Stateful Service Insertion," which also names the present inventors as its inventors. The disclosure of the Copending Application is hereby incorporated by reference in its entirety.

A security platform under the present invention is applicable to all existing message delivery paradigms on the Internet, including ANYCAST (discussed above), MULTICAST, UNICAST, and MULTI-UNICAST for IP data packets.

Figure 2:
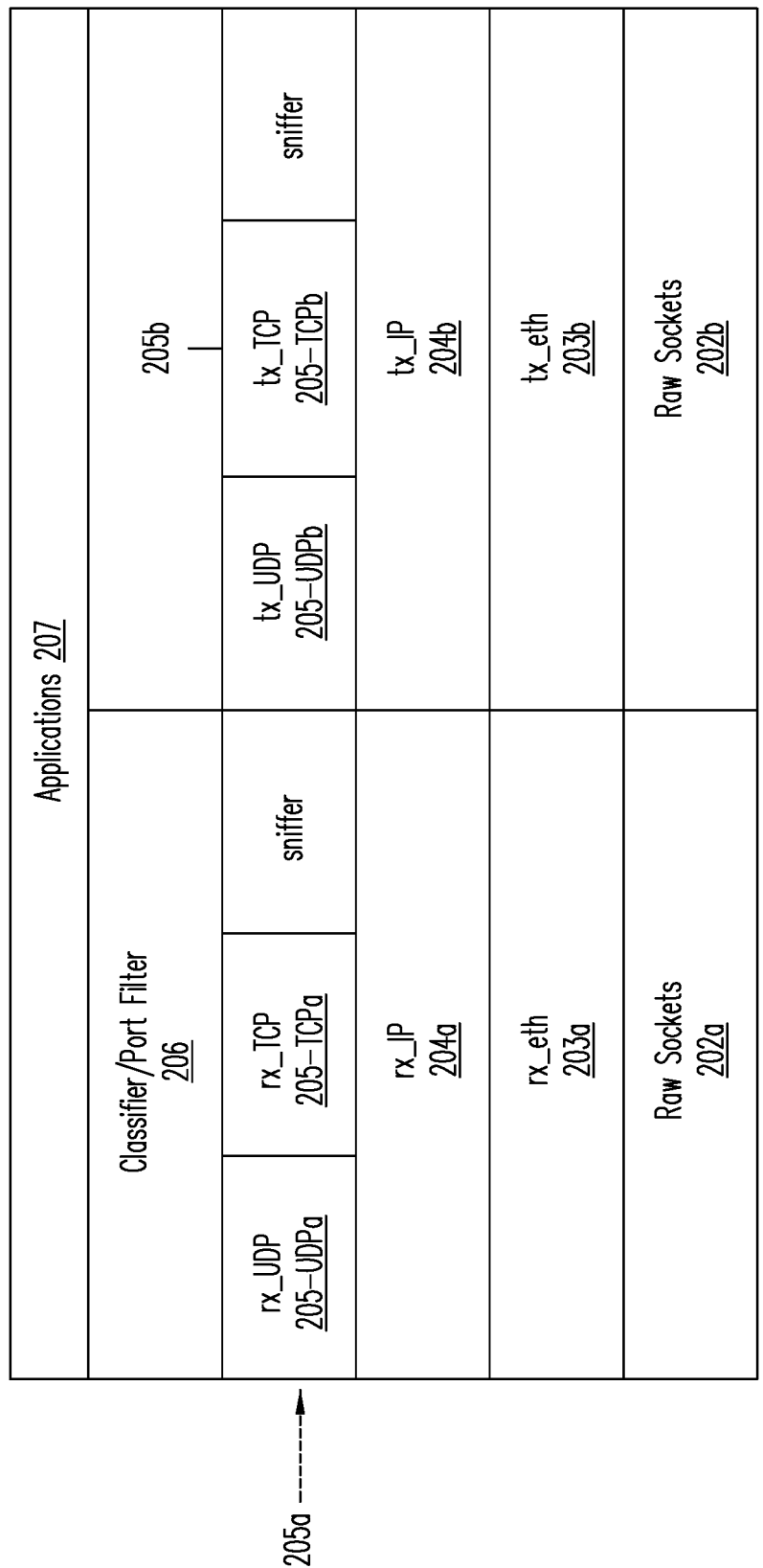
FIG. 2 illustrates an architecture of security platform 101, from the communication protocol perspective, in accordance with one embodiment of the present invention.

FIG. 2 illustrates an architecture of security platform 101, from the communication protocol perspective, in accordance with one embodiment of the present invention. As shown in FIG. 2, security platform 101 implement protocol stacks that include physical, link and IP layers 202a-202b, 203a-203b and 204a-204b. In one embodiment, protocol layers 202a-202b, 203a-203b and 204a-204b may be implemented in hardware, firmware or software in a conventional manner. (In FIG. 2, the side labeled "a" of the protocol layers represents protocol handlers for data packets received into network security platform 101, and the side labeled "b" of the protocol layers represents protocol handlers for data packets to be transmitted out of security platform 101.) Above IP layers 204a-204b are User Datagram Protocol (UDP) and TCP transport layers 205a-205b, which include UDP layers 205-UDPa and 205-UDPb, which implement stateless data traffic control, and TCP layers 205-TCPa, and 205-TCPb, which implement stateful (e.g., virtual circuit) data traffic control. Tools are also provided in transport layers 105a-105b for examination of the meta-data and the payloads of the data packets ("sniffers") and for controlling and optimizing the performance of the TCP state machines. As discussed below, these tools may be accessed from the applications in application layer 107 through callback methods.

Figure 3:
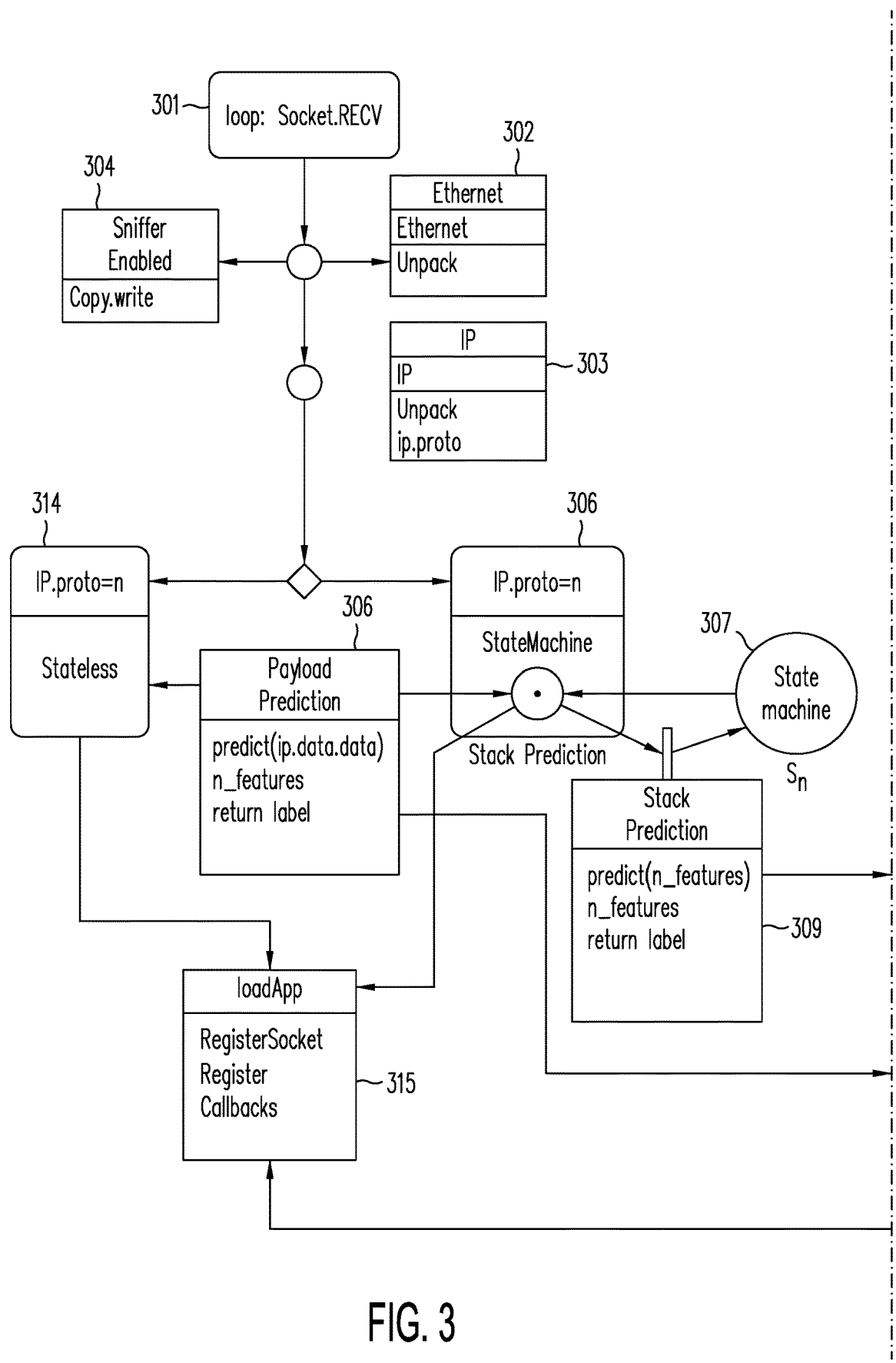
FIGS. 3 and 3-A together form a flow diagram illustrating the operation of security platform 101.

As security platform 101 interacts primarily with application programs in application layer 207 and UDP or TCP protocol handlers in transport layers 205a, security platform 101 is illustrated in FIG. 2 as residing in layer 206 between transport layer 205a and application layer 207. FIG. 3 is a flow diagram illustrating the operation of security platform 101.

As shown in FIG. 3, security platform 101 has a main loop that begins operation from each data packet received at the protocol hander 301 of the physical layer (i.e., raw sockets 202a). The metadata and the payloads are passed as they are received to link layer protocol handler 302. In one embodiment, the data packets are ethernet frames, which are queued in link layer protocol handler 302 (residing in link layer 203a) for unpacking. Concurrently, packet sniffer 304 may be enabled to log each incoming data packet's metadata, payload (i.e., an IP packet) or both. Each IP packet unpacked from the ethernet frame is then passed to IP layer handler 303 (residing in IP layer 204a).

Depending on whether the incoming IP packet belongs to stateless data traffic (i.e., it includes a UDP segment) or stateful data traffic (i.e., it includes a TCP segment), appropriate UDP handler 314 (residing in transport layer 205-UDPa) or TCP handler 306 (residing in transport layer 205-TCPa) are loaded. The transport protocol handler, together with an appropriate application program for handling the payload, are selected by applying stack classifier 308 and payload classifier 309 on the IP packet. The payload may be tokenized to binary, UTF-8, UTF-16, ASCII, Unicode, ANSI, ANS.1 or other protocol or message specific formats, based on the expected encoding type. Tokenization facilitates uncovering the identity of the targeted application program or natural language elements in the payload, which allows developing an Application/Natural Language response matrix to properly select an appropriate application program residing in application layer 207 to deploy.

In one embodiment, the protocol handlers on the transmit side (i.e., raw sockets 202-a, link layer 203b, IP layer 204b, and transport layers 205-UDPb and 205-TCPb) may be implemented by conventional protocol handlers.

For stateful data traffic, based on both the TCP segment and the payload of the IP packet, stack classifier 308 selects one or more labels ("client labels") which each identify a TCP stack (i.e., TCP state machine) having optimized parameter values for handling that expected exploit or an expected target system (e.g., Windows TCP behavior or Linux TCP behavior). Based on the payload of the IP packet, payload classifier 313 selects one or more labels ("server labels") which each identify an application program for handling the payload.

The identified client and server labels are further compared or matched for compatibility of operating together. If more than one server label satisfies the initial matching criteria with the selected TCP stack, one or more arbitration mechanism can be provided to select one of the application programs based on additional criteria.

Stack classifier 308 and payload classifier 313 are tuned to best fit single packet payloads. In one embodiment, each classifier is implemented as a one-vs-all multiclass classifier trained using supervised or unsupervisd training techniques, or both. Such training techniques include, for example, "support vector machine" (SVM) techniques. One example of such a multiclass classifier uses linear support vector clustering ("LinearSVC") estimators, known to those of ordinary skill in the art. Software packages for implementing a LinearSVC estimator are readily available to be adapted for building stack classifier 308 and payload classified 313. Of course, other estimators based on other approaches may also be incorporated into stack classifier 308 and payload classifier 313 (e.g., in a pipeline of multiple estimators). Such estimators would be incorporated based on their successful validation against real-world data traffic.

To train each classifier, the classifier is provided examples of IP packets (with the payloads) that correspond to each expected label. In LinearSVC, the classifier selects a label when the sample IP packet has an evaluated model distance that is greater than a predetermined margin over corresponding value characteristic of each of the rest of the labels. Security platform 101 may allow application programs to access and to train the classifiers ("application reinforcement"). Application reinforcement may be achieved, for example, by the application program indicating an approval rating (e.g., validating or invalidating) the classification on an incoming IP packet, thereby allowing real time fine-tuning and training of the classifier.

In one embodiment, training data are provided in JSON format files, each file providing one or more payload samples that are each expressed as a string or a byte array. Each payload sample may be associated with a list of labels to indicate to the classifier whether the sample is an example or not an example of a data packet corresponding to each label.

As stack classifier 308 and payload classifier 313 selects the respective TCP stacks and application programs based on message content, neither the TCP stacks nor the application program need to be tied to any static application-imposed, protocol-imposed, or kernel-imposed rules, such as limited statically assigned port ranges. This approach is particularly valuable in engaging hostile data traffic mimicking legitimate data traffic. If stack classifier 308 fails to select an existing label, a default TCP stack will be selected. Similarly, if payload classifier 313 fails to select an existing label, the application program is selected using a conventional approach, such as matching the application according to the designation port specified in the IP packet.

FIG. 3 shows application 317 being dynamically loaded by application selector 316 based on the label selected by payload classifier 313. Alternatively, the applications may also be loaded at system start-up. In one embodiment, each application provides an entry point (class "main( )"). The application fetches data from the loaded TCP stack using the "recv data" function as a primary method. The application may also specify protocol configuration parameters for a state machine that can be used in conjunction with the application. For example, the application may specify that the protocol to be used is TCP or UDP, the ports that are the protocol handler listens to, including every port or a specific range of ports. In this manner, every port may be monitored, thus reducing the risk of missing activities at unmonitored ports. Each application sets a variable "var" which is used by payload classifier 313 to match the client label. The application may also specify source and designation IP addresses for filter purpose, including specifying a range of IP addresses (e.g., as a CIDR block).

The application may set one or more flags in the TCP segments of outgoing data packets, so as to affect the network behavior of the application presented to the recipients. The application may also set the source and designation IP addresses, including specifying a range of IP addresses (e.g., as a CIDR block). When the payload received or to be transmitted is greater has a length than the configured maximum segment size (MSS), the payload may be buffered accordingly. For example, in TCP applications, these operations may be effectuated using callback functions of the TCP stack:

SEND_RST( )//sets the TCP Reset flag is set
SEND_RST_ACK( )//sets the TCP Reset and Ack flags
SEND_FIN_ACK( )//sets the TCP Fin and Ack flags
SEND_FIN_PSH_ACK(data)//sets the TCP Fin, Push and Ack flags
SEND_ACK( )//sets the TCP Ack flag
SEND_SYN_ACK( )//sets TCP Syn and ACK flags
SEND_DATA(self, data)//sends the data in argument
chunksdata(s)//create data buffer that is larger than a single packet payload The above detailed description is provided to illustrate specific embodiments of the present invention and is not intended to be limiting. Numerous variations and variations within the scope of the present invention are possible. The present invention is set forth in the accompanying claims.

We claim:

1. In a server having a network interface that is configured to receive and transmit Internet Protocol (IP) data packets, a security platform comprising:
    a plurality of protocol stacks each configured to receive and to transmit the IP data packets over the network interface, wherein at least two of the protocol stacks have predetermined performance characteristics that are different from each other and wherein each protocol stack includes one or more program interfaces to allow changes to its performance characteristics;
    a plurality of application programs each configured to receive and to transmit payloads of the IP data packets, wherein at least two of the application programs are customized to handle different content types in the payloads and wherein each application program accesses at least one of the program interfaces of at least one of the protocol stacks to tune performance characteristics of the accessed protocol stack;
    a plurality of classifiers configured to inspect at a given time IP data packets then received in the network interface to select one of the at least two protocol stacks and one of the application programs to service the IP data packets at the given time; and
    a control program to load and run the selected protocol stack and the selected application program.

2. The security platform of claim 1, wherein at least one of the protocol stacks includes a TCP handler.

3. The security platform of claim 2, wherein the TCP handler comprises a state machine.

4. The security platform of claim 3, wherein the protocol stack of the TCP handler allows the selected application program to modify parameters of the state machine.

5. The security platform of claim 3, wherein the different performance characteristics result from different state machine parameter values and wherein the classifiers take into account the different state machine parameter values in protocol stack selection.

6. The security platform of claim 1, wherein at least one of the protocol stacks includes a User Datagram Protocol (UDP) handler.

7. The security platform of claim 1, wherein the selected application program mimics predetermined operational characteristics of a target application.

8. The security platform of claim 7, wherein the IP data packets of the given time are diverted from the target application.

9. The security platform of claim 8, wherein the target application program mimics a IP ANYCAST application.

10. The security platform of claim 1, wherein the selected application program mimics a device interface for a sensor.

11. The security platform of claim 10, wherein the sensor comprises an IoT sensor.

12. The security platform of claim 1, wherein the classifiers are trained using machine learning techniques.

13. The security platform of claim 12, wherein the classifiers are training using both supervised and unsupervised machine learning techniques.

14. The security platform of claim 1, wherein the classifiers implement a one-versus-all multiclass classification scheme.

15. The security platform of claim 1, wherein the classifiers implement a one-versus-rest multiclass classification scheme.

16. The security platform of claim 1, wherein one of the classifiers applies linear support vector clustering (LinearSVC) to the IP data packets.

17. The security platform of claim 1, wherein the program interface of at least one protocol stack allows the selected application to specify ports for filtering data packets.

18. The security platform of claim 1 wherein the classifiers select the selected application program based on inspecting the IP data packets of the given time for a predicted exploitation or a predicted target system.

19. The security platform of claim 1, wherein the selected application program provides responses according to message patterns in the IP data packets of the given time.

20. The security platform of claim 1, wherein one of the protocol stacks tokenizes the payloads based on an expected encoding type.

21. The security platform of claim 20, wherein the expected encoding type is one of: binary, Unicode, character string, ANS.1 and ANSI encoding schemes.

22. The security platform of claim 1, wherein the classifiers use application identifiers and natural language elements uncovered in the IP data packets of the given time to select an application program.

23. The security platform of claim 1, wherein the classifiers use probe information in the metadata of the IP data packets of the given time to select the protocol stack.

* * * * *